Figures 4, 5:
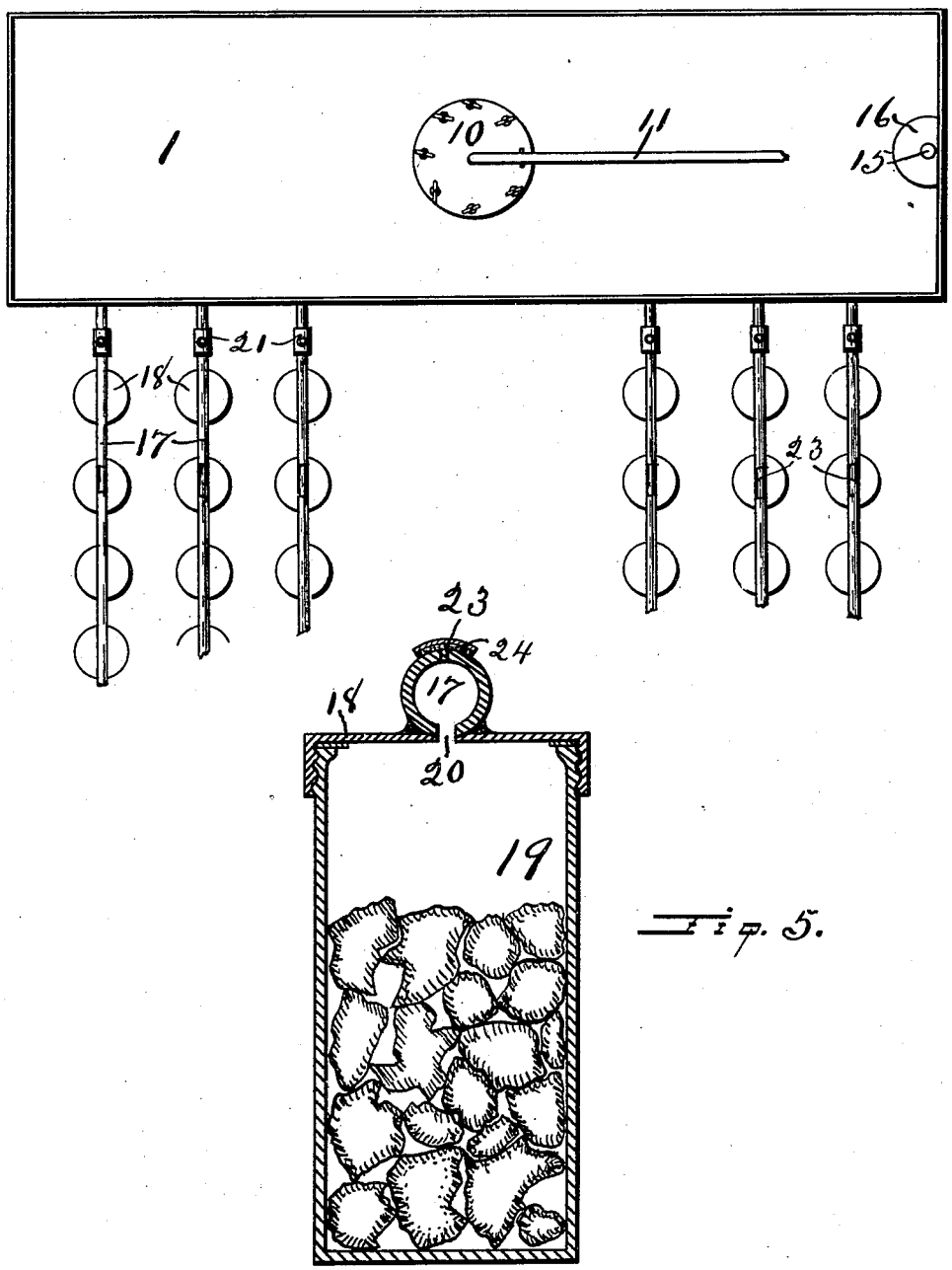

No. 691,357. Patented Jan. 21, 1902.
W. W. COZINS.
ACETYLENE GAS GENERATOR.
(Application filed Mar. 26, 1901.)
(No Model.) 2 Sheets—Sheet I.
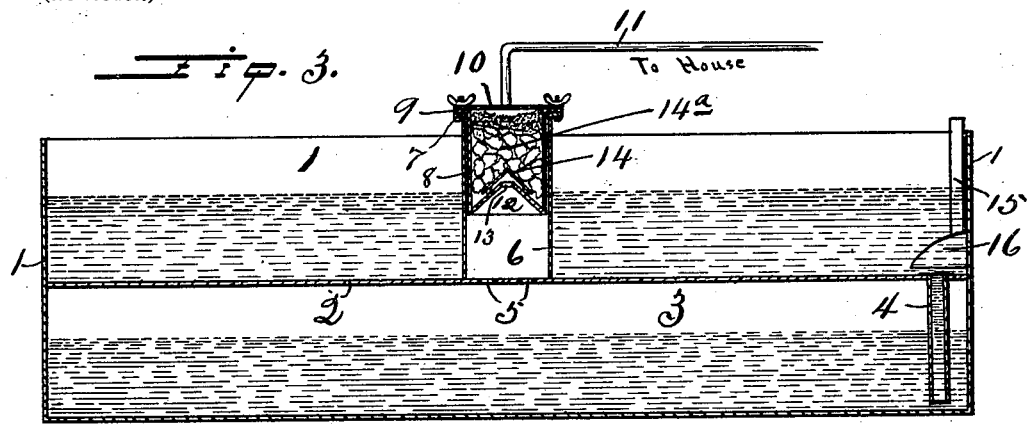
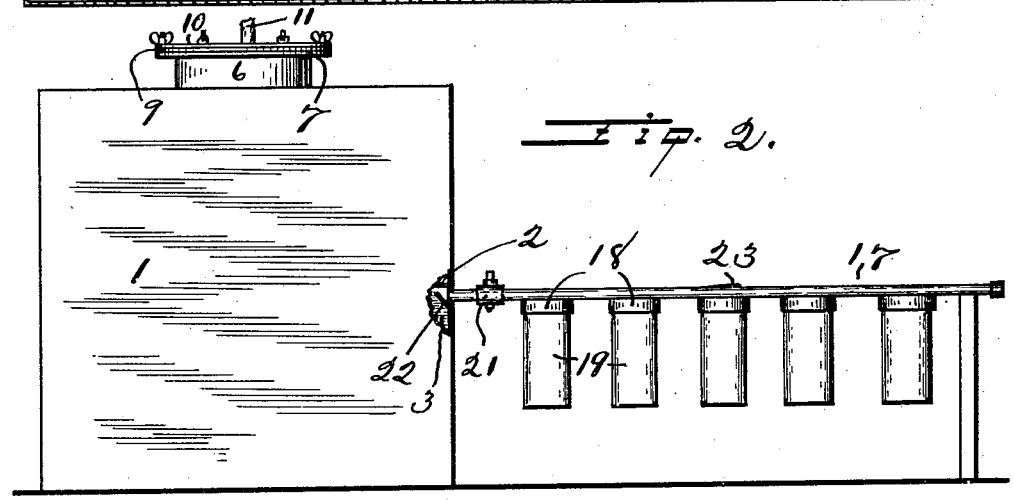
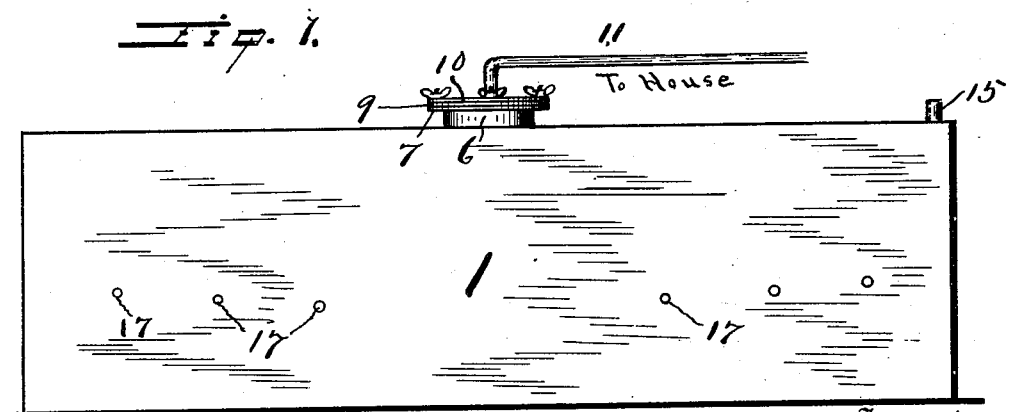
Witnesses
Molbry Haynes
Percy S. Webster
Inventor
William W. Cozins
By Joshua B. Webster
Attorney
THE NORRIS PETERS CO., PHOTO-LITHO., WASHINGTON, D. C.

No. 691,357. Patented Jan. 21, 1902.
W. W. COZINS.
ACETYLENE GAS GENERATOR.
(Application filed Mar. 26, 1901.)

(No Model.) 2 Sheets—Sheet 2.

UNITED STATES PATENT OFFICE.

WILLIAM W. COZINS, OF LINDEN, CALIFORNIA.

ACETYLENE-GAS GENERATOR.

SPECIFICATION forming part of Letters Patent No. 691,357, dated January 21, 1902.

Application filed March 26, 1901. Serial No. 52,903. (No model.)

*To all whom it may concern:*

Be it known that I, WILLIAM W. COZINS, a citizen of the United States, residing at Linden, in the county of San Joaquin and State of California, have invented certain new and useful Improvements in Acetylene-Gas Generators; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in acetylene-gas generators, and particularly to that class known as "automatic" generators.

My object is to furnish a machine which will generate gas while the same is being consumed and cease said generation when no more is required.

I also purpose to produce a machine which may be cheaply constructed, requiring a minimum floor-space, effective in its operation, and capable of furnishing a pure and powerful illuminating-gas. This I accomplish by the use of the combined parts arranged and formed together as hereinafter described, and particularly pointed out in the claim hereunto annexed, reference being had to the accompanying drawings, which form a part hereof, in which—

Figure 1 is a side elevation of my improved gas-generator with the carbid-jars removed. Fig. 2 is an end view of the same with the carbid-jars in position. Fig. 3 is a longitudinal vertical section of the same. Fig. 4 is a top view of the generator. Fig. 5 is a detail enlarged sectional view of one of the carbid-holders, showing its connection with the generating-pipe.

Similar figures of reference indicate corresponding parts in the several views.

I use a vessel 1, having a false bottom 2 rigidly attached horizontally therein to the sides and ends thereof. Said vessel 1 may be of any form and size, but I preferably use a square or rectangular vessel. The lower chamber 3, formed by the false bottom 2, is formed and rendered air-tight, except at a suitable point in the false bottom 2, wherein a pipe 4 of suitable size is rigidly attached and adapted to extend downwardly to near the bottom of the said vessel 1. One or more openings 5 are formed in the false bottom 2 at a suitable point, preferably the center thereof, over which is rigidly attached a drier constructed, preferably, as follows: A cylindrical chamber 6 of suitable size has its lower end rigidly attached to the false bottom 2, so as to communicate with the chamber 3 by means of the openings 5. The top end of the said chamber 6 has a flange 7, formed outwardly, on which a removable receptacle 8 is adapted to rest, said receptacle 8 having overhanging lips 9 formed on its top therefor. A top or cover 10 is placed over the receptacle 8 and suitably secured air-tight thereon. From the cover 10 a pipe 11 is adapted to communicate with any place desired. The bottom 12 of the receptacle 8 is in the form of an inverted funnel, with an opening 13 in the apex thereof. Over the opening 13 I place a shield 14, similar in form to the bottom 12, raised slightly above the said bottom 12, so as to allow a free circulation of air or gas. The receptacle 8 is adapted to contain a purifying agent $14^a$, preferably calcium carbid and quicklime, or either separately. Over the pipe 4 I arrange a hood 16, as shown in Fig. 3, having a suitable pipe 15, which is adapted to conduct any gas overflowing from the gas-chamber 3 to the outside of the building, thereby preventing any liability of an accumulation of gas, and consequently an explosion.

For the carbid-holder or generator proper I provide a pipe 17 of suitable length with metallic covers 18, securely attached thereto, as shown in Figs. 2 and 5, at suitable intervals thereon. Suitable cans 19 may be attached to the covers 18, said cans 19 each being adapted to contain a small quantity of calcium carbid. A slot 20 is formed in the pipe 17 and each cover 18, so as to permit free communication with the pipe to and from the cans 19. The pipe 17 has the free end closed, and the other end is inserted in the side of the vessel 1, near the false bottom 2, so as to communicate with the gas-chamber 3. A stop-cock 21 is inserted in the pipe 17, near the vessel 1, for the purpose as will be shown. A dam 22 is formed beneath the opening of the pipe 17 into the chamber 3, so as to cause the water in the said chamber to rise above the level of the pipe 17, which allows a maximum quantity of gas to be used from the gas-chamber before generation takes place again, leaving a minimum quantity of residual gas in the chamber 3.

When desired, I arrange a series of pipes 17, as shown in Fig. 4, one slightly above the succeeding one, as shown in Fig. 1, in order that when one section of pipe with its depending cans 19 is exhausted of its gas the water by rising slightly higher will flow into the succeeding pipe 17 above, &c.

I arrange a safety-valve 23 over an opening in each of the pipes 17, so as to prevent the bursting of the cans 19 and pipes 17 should the stop-cock 21 become closed while generation is in progress. Said valve 23 is composed of a spring-plate $23^a$, riveted at $23^b$ or otherwise suitably attached to pipe 17 and having elastic material 24 arranged on its under face, which, by reason of the spring, is adapted to close said opening to a given pressure of gas within.

The operation of my improved acetylene-gas generator is as follows: The carbid-holders or generators 19 are all filled with calcium carbid and placed in position by being screwed to the covers 18 and rendered air-tight, and the stop-cocks 21 are opened. The receptacle 8 is then filled with the purifying agent $14^a$ and placed in the chamber 6, whereupon the cover 10 is placed and secured in position and rendered air-tight. Water is then introduced into the vessel 1 in sufficient quantity to fill the chamber 3 by reason of the pipe 4, the air contained in said chamber 3 being allowed to escape by means of the house-pipe 11, which is left open for that purpose. A quantity of water is deposited in the vessel 1 after the chamber 3 is filled, so as to give the gas the required pressure. As the water rises in the chamber 3 and flows over the lower dam 22 the same is conducted into the cans 19 by the pipe 17 and the generation of gas begins. As soon as the generation of gas begins and the atmosphere is expelled from the chambers 3 and 6 and the house-pipe 11 said house-pipe is closed and the gas is ready for use. When the water flows along the pipe 17, the same is precipitated into the first can by reason of the slot 20 therein. When the carbid in said first can is exhausted of its gas and the consumption of gas continues, the water fills the said first can and follows to the second on that pipe until the carbid in that one is exhausted, and the operation continues, the water flowing into one can only at a time. When the consumption of gas ceases, the volume of gas generated by the moisture in the can containing carbid under the process of generation flows into the chamber 3 and presses the water contained therein out through the pipe 4 into the vessel 1. As the water is forced by the pressure of gas out of the chamber 3 the same ceases to flow over the dam 22 into the pipe 17 and cans 19, thereby discontinuing the generation of gas until the gas is used out of the chambers 3 sufficiently to allow the water to rise and flow over the dam 22, whereupon generation begins again and continues until stopped, as above stated.

Should water by accident find its way into the generators until the generators have filled the chamber 3 completely and forced the water from said chamber 3 through the pipe 4 into the vessel 1 until the lower end of the pipe 4 is exposed, the surplus gas will find its way out through the said pipe 4, where it will be caught by the hood 16, whereupon the same will be conducted to the open atmosphere by the pipe 15, thus preventing the accumulation of gas in a room, where a light introduced would cause an explosion.

When all the cans in one section of pipe 17 are exhausted of their carbid, the water rises in the chamber 3 and flows over the dam 22 of the next higher pipe 17, whereupon the stop-cock 21 of the aforementioned pipe 17 may be closed and the cans 19 refilled, ready for use again when the stop-cock is reopened.

The gas before use passes through the holes 5 into the chamber 6 and from there through the opening 13 in the bottom 12 of the receptacle 8, where it is purified and cooled by the agent $14^a$, contained in said receptacle 8, whereupon said gas proceeds into the house-pipe 11, where it may be used as desired.

A few of the principal features that are valuable present in my machine are that I dispense with a rising-and-falling gasometer, that the gas is cooled by its contact with a large double surface of water above and below the same, that the cost of construction is reduced to a minimum, and that a sectional generator is provided which may be filled while the generation of gas is in progress and without the introduction of air into the gas-chamber.

Having thus described my invention, what I claim as new, and desire to secure by Letters Patent, is—

In an acetylene-gas generator the combination of the water vessel and gas-chamber located above and below each other respectively, the connecting-pipe 4 extending into said gas-chamber, the hood 16 provided with the pipe 15, the series of pipes 17 arranged at different heights, and each provided with a stop-cock 21, inserted into the side of the said gas-chamber, each pipe being provided with the safety-valve 23, a series of can-covers 18 rigidly attached to each of the said pipes 17 and having the slots 20 arranged therein, the cans 19 suitably attached to the covers 18 and the dams 22 arranged beneath the inner ends of the pipes 17, all arranged and operating substantially as shown and described and for the purposes set forth herein.

In testimony whereof I affix my signature in presence of two witnesses.

WILLIAM W. COZINS.

Witnesses:
MALBRY HAYNES,
JOSHUA B. WEBSTER.